Feb. 26, 1963  B. F. BROWN, JR., ET AL  3,079,553
MOVING VEHICLE PHOTO-ELECTRIC TIMING DEVICE
Filed Nov. 18, 1960  3 Sheets-Sheet 1
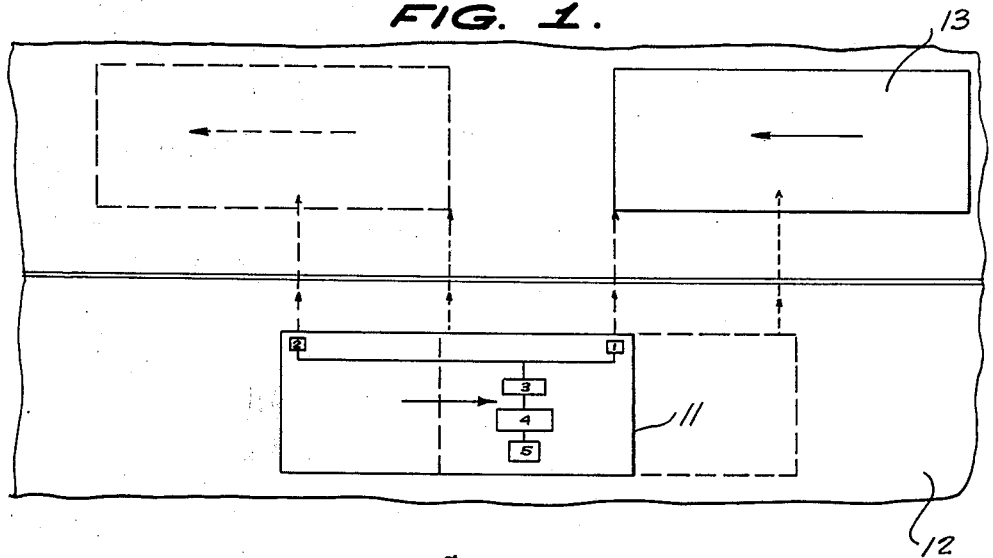
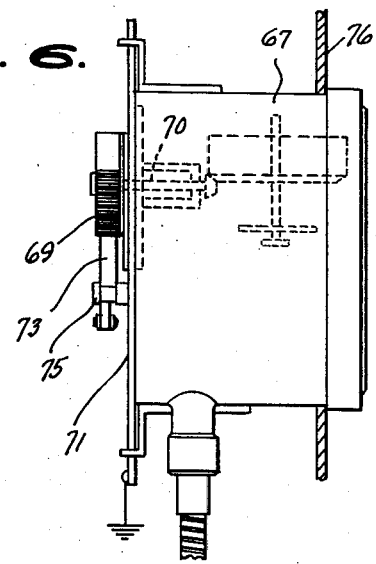
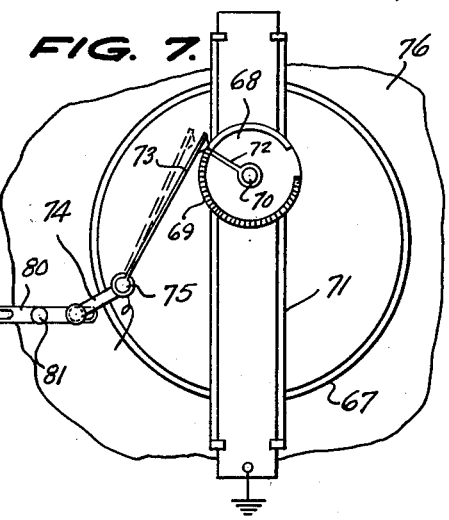
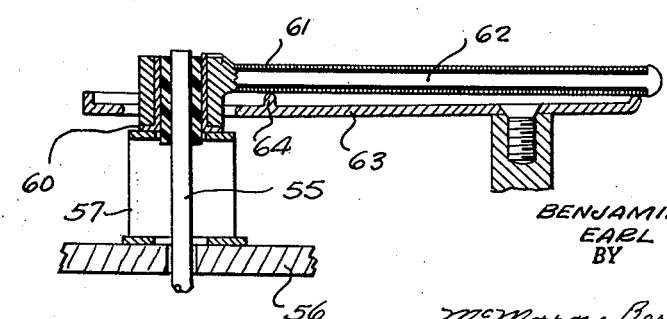
INVENTORS
BENJAMIN F. BROWN, JR.
EARL C. NELSEN,
BY
McMorrow, Berman & Davidson
ATTORNEYS Feb. 26, 1963     B. F. BROWN, JR., ET AL     3,079,553
MOVING VEHICLE PHOTO-ELECTRIC TIMING DEVICE
Filed Nov. 18, 1960     3 Sheets-Sheet 2

INVENTORS
BENJAMIN F. BROWN, JR.
EARL C. NELSEN,
BY

McMorrow, Berman + Davidson
ATTORNEYS.

Feb. 26, 1963 B. F. BROWN, JR., ET AL 3,079,553
MOVING VEHICLE PHOTO-ELECTRIC TIMING DEVICE
Filed Nov. 18, 1960 3 Sheets-Sheet 3
FIG. 3.
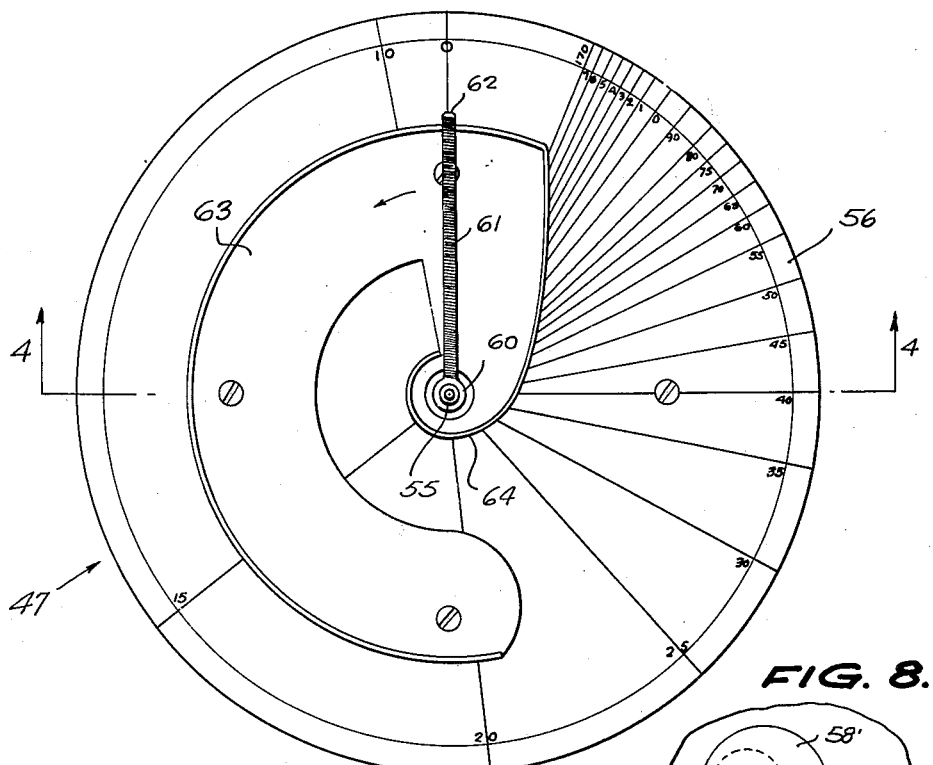
FIG. 8.
FIG. 4.
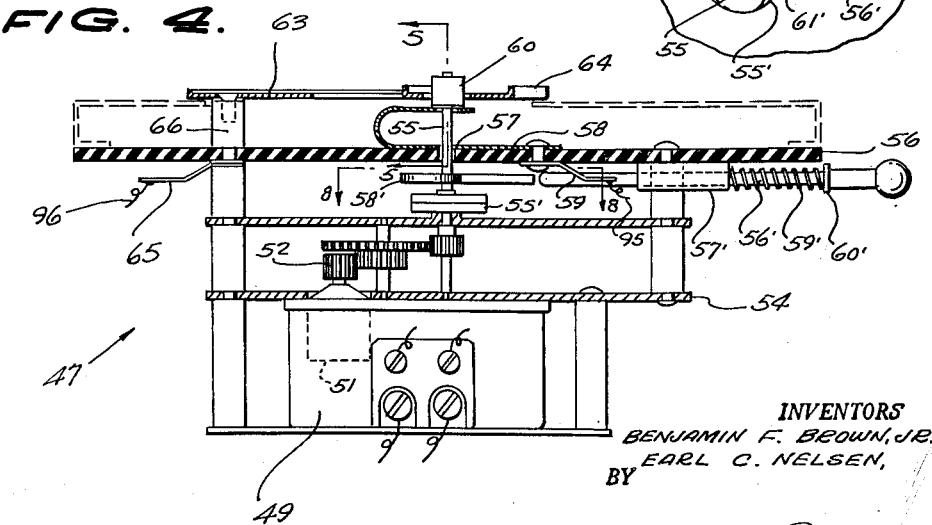
INVENTORS
BENJAMIN F. BROWN, JR.
EARL C. NELSEN,
BY
McMorrow, Berman & Davidson
ATTORNEYS.

United States Patent Office 3,079,553
Patented Feb. 26, 1963

1

3,079,553
MOVING VEHICLE PHOTO-ELECTRIC
TIMING DEVICE
Benjamin F. Brown, Jr., 3309 E. Riverside, and Earl C. Nelsen, 134 Texas Ave., Morse Shores, both of Fort Myers, Fla.
Filed Nov. 18, 1960, Ser. No. 70,181
10 Claims. (Cl. 324—70)

This invention relates to apparatus for measuring the speed of vehicles, and more particularly to an apparatus which may be employed on a moving vehicle, such as a police car, or the like, to accurately measure the speed of a motor vehicle.

The main object of the invention is to provide a novel and improved vehicle speed measuring apparatus adapted to be mounted on a police car or similar vehicle, the apparatus being relatively simple in construction, being reliable in operation, and providing an accurate compensation for taking into account the speed of the vehicle on which the apparatus is mounted.

A further object of the invention is to provide an improved vehicle speed measuring apparatus particularly suitable for use on a police car or similar vehicle, the apparatus involving relatively inexpensive components, being rugged in construction, and being flexible in its operation, so that it may be employed in a variety of ways, for example, to measure the speed of an oncoming vehicle, or alternatively to measure the speed of a vehicle approaching from the rear.

A still further object of the invention is to provide an improved vehicle speed measuring apparatus which is easy to install, which is relatively compact in size, and which is simple to operate.

A still further object of the invention is to provide an improved vehicle speed measuring device which may be mounted on a supervisory vehicle, such as a police car, or the like, to measure the speed of other vehicles, the apparatus being provided with means to compensate for the speed of the supervisory vehicle in order to obtain an accurate computation of the speed of the vehicle being checked.

Further objects and advantages of the invention will become apparent from the following description and claims, and from the accompanying drawings, wherein:

FIGURE 1 is a top view diagrammatically showing a supervisory vehicle equipped with a speed measuring apparatus according to the present invention and illustrating the relative disposition of the parts of the apparatus on the supervisory vehicle, with respect to a vehicle passing in the opposite direction whose speed is to be checked.

FIGURE 3 is an enlarged top plan view of the timer-operated variable-resistance device employed in the circuit of FIGURE 2.

FIGURE 4 is a cross sectional view taken substantially on the line 4—4 of FIGURE 3.

FIGURE 5 is an enlarged fragmentary cross sectional view taken substantially on the line 5—5 of FIGURE 4.

FIGURE 6 is a fragmentary vertical cross sectional view taken through a portion of the instrument panel of the supervisory vehicle of FIGURE 1, showing the speedometer-controlled variable resistance device employed in the circuit of FIGURE 2.

FIGURE 7 is a rear elevational view of the speedometer-controlled variable resistance device shown in FIGURE 6.

FIGURE 8 is a cross-sectional detail view taken substantially on line 8—8 of FIGURE 4.

2

Figure 2:
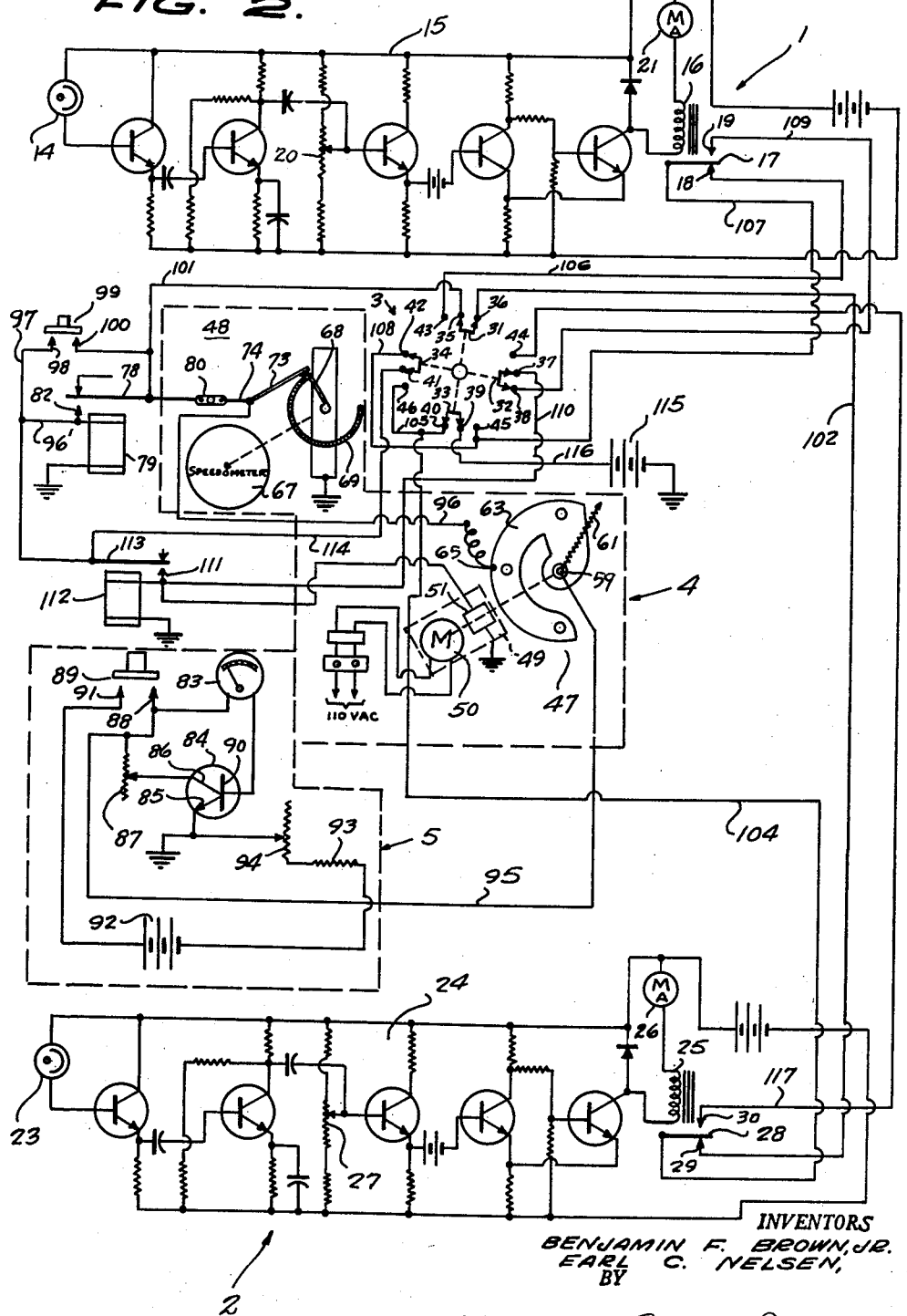
FIGURE 2 is a schematic electrical wiring diagram showing the electrical connections of the components of the speed measuring apparatus employed on the supervisory vehicle of FIGURE 1.

Referring to the drawings, and more particularly to FIGURE 1, 11 designates a supervisory vehicle, such as a police car, or the like, which is illustrated as traveling on one side of a roadway 12 and which is provided with an improved speed-measuring apparatus according to the present invention, arranged thereon in a manner to check the speed of a vehicle 13 traveling on the other side of the roadway as the vehicle 13 passes the supervisory vehicle 11.

As shown in FIGURE 1, the speed measuring apparatus may be considered as comprising the respective components numbered 1, 2, 3, 4 and 5 which are arranged on the supervisory vehicle 11 generally in the manner illustrated in FIGURE 1 and which are electrically interconnected, in a manner presently to be described, so as to compute the speed of a passing vehicle 13. Thus, the apparatus comprises a forward photo-electric vehicle-responsive unit 1 which is mounted at the forward left portion of the supervisory vehicle 11, for example, on the left front fender in the approximate position illustrated in FIGURE 1. The apparatus also comprises a rear photoelectric vehicle-responsive unit 2 which is mounted on the left rear portion of the supervisory vehicle 11, for example, on the left rear fender in the approximate position shown in FIGURE 1. The apparatus also comprises a reversing switch section 3 for at times reversing the action of the device so that it responds to a vehicle passing the supervisory vehicle from the rear when the supervisory vehicle is stationary, whereas in the normal setting of the switch section 3, the apparatus is arranged to respond to a vehicle traveling in the direction opposite to that in which the supervisory vehicle is traveling. The apparatus also includes the variable resistance section 4 which establishes values of resistance in accordance with the speed of the vehicle being checked and the speed of the supervisory vehicle 11, to provide proper compensation therefor. Finally, the apparatus comprises the computing section 5 which is similar in nature to an ohmmeter but which is calibrated to provide a reading in miles per hour or similar speed units.

The forward vehicle-responsive unit 1 comprises a photo cell 14 which is connected to the input of a conventional transistorized amplifier 15 whose output includes a relay 16 having the armature 17, the lower contact 18 and the upper contact 19, the armature 17 normally engaging said lower contact 18 but being elevated to engage the upper contact 19 responsive to energization of the relay 16, which occurs when the amplifier circuit is triggered by the response of the photoelectric cell 14 to the passage of an oncoming vehicle, such as the vehicle 13 in FIGURE 1. The circuit 15 is conventional and may consist of any well known amplifier circuit arranged to respond to the reduction of ambient light received by the photoelectric detection cell 14 in a manner to provide a sufficient output current to energize the relay 16. In the particular circuit illustrated, a sensitivity control potentiometer 20 is provided in the amplifier and a range-indicating milliammeter 21 is provided in the output circuit in series with the winding of the relay 16 to enable the sensitivity of the amplifier to be adjusted so as to provide triggering of the amplifier when a vehicle 13 reaches a predetermined point with respect to the forward vehicle-responsive unit 1. As will be readily understood, the sensitivity of the vehicle-responsive unit 1 may therefore be adjusted in accordance with the prevailing ambient light conditions and in accordance with the conditions on the highway 12, enabling the apparatus to be adjusted so that it will respond when a vehicle 13 comes within a preset range with respect to the supervisory vehicle 11. The milliammeter 21 may be mounted in any convenient location, for example, on the dashboard of the supervisory vehicle, so that the operators of the supervisory vehicle can readily view same to determine the sensitivity setting of the vehicle-responsive unit 1.

The vehicle-responsive unit 2 is identical in structure to the vehicle-sensitive unit 1, except that it is mounted on the left rear fender of the supervisory vehicle. The unit 2 includes the photoelectric cell 23, the triggering amplifier 24, the relay 25 connected in the output of the amplifier 24 and the range-indicating milliammeter 26, which may be mounted on the dashboard of the supervisory vehicle. The amplifier 24 includes the sensitivity-adjusting potentiometer 27, which is employed for the same purpose as the previously described sensitivity-adjusting potentiometer 20, namely, for adjusting the sensitivity of the vehicle-responsive unit 2.

The output relay 25 of the unit 2 is provided with the armature 28 which normally engages its bottom contact 29 and which is movable to engage its upper contact 30 responsive to the energization of relay 25.

The switching unit 3 comprises a four-pole two-position rotary switch provided with the four bridging contact members 31, 32, 33 and 34. In one position of the switching unit 3, namely, the normal position thereof shown in FIGURE 2, the bridging member 31 connects a pair of contacts 35 and 36, the bridging member 32 connects a pair of contacts 37 and 38, the bridging member 33 connects a pair of contacts 39 and 40 and the bridging member 34 connects a pair of contacts 41 and 42. As will be presently explained, this establishes the proper circuits for operation of the apparatus in its normal manner, namely, in a manner illustrated in FIGURE 1, wherein it is desired to check the speed of a vehicle 13 passing on the opposite side of the roadway. When the switch device 3 is adjusted to its other position, a respective bridging member connects contact 35 to a contact 43, connects contact 37 to a contact 44, connects contact 39 to a contact 45 and connects contact 41 to a contact 46. This arranges the apparatus so that it will measure the speed of a vehicle passing the supervisory vehicle 11 from the rear with the supervisory vehicle 11 parked or stationary.

The variable resistance unit 4 comprises a timer-operated resistance assembly 47 and a speedometer-operated resistance assembly 48.

The timing device 47 comprises an electrical stop clock assembly 49 which includes a clock motor 50 and an electrically operated clutch device 51 which, when energized, connects the output shaft of the motor 50 to a driving pinion 52. As shown in FIGURES 3 and 4, the stop clock assembly 49 is mounted in the lower portion of a suitable supporting frame 54, and journaled in the frame is a rotary shaft 55 which is gearingly coupled to the driving pinion 52 so that the shaft 55 rotates responsive to the energization of the clutch device 51.

Secured on the frame 54 is an insulating disc 56, the shaft 55 extending through a bushing 57 in the center of the disc 56, the bushing 57 comprising a portion of a conductive bracket member 58 which is provided with a terminal lug 59. The bracket 57 is conductively engaged with the shaft 55 by engagement with a collar element 60 secured on the upper portion of the shaft member as viewed in FIGURE 4, the collar element 60 being electrically connected to the inner end of a resistance winding 61 wound on an insulating arm 62 rigidly secured to the collar element 60 and extending radially therefrom. Mounted on the disc 56 subjacent the arm 62 and insulated from the collar element 60 is a generally spiral-shaped plate member 63 formed with an upstanding contact flange 64 which engages the resistance winding 61 and which has the generally spiral shape shown in FIGURE 3 with its origin substantially coiniciding with the axis of the shaft 55. A terminal lug 65 is electrically connected to the conductive plate member 63 through a metal spacing member 66, as shown in FIGURE 4. Thus, the resistance defined between the terminals 59 and 65 will be in accordance with the degree of rotation of the arm 62, which will therefore be in accordance with the degree of rotation of shaft 55. The contact flange 64 has the same shape as the contoured spiral edge of plate member 63, and this shape may be such as to provide a predetermined increment of resistance between the terminals 59 and 65 for a corresponding predetermined degree of rotation of shaft 55. The angular rotation of shaft 55 is in accordance with the time of energization of the clutch device 51, so that the resistance defined between the terminals 59 and 65 is thus in accordance with the duration of energization of clutch 51. As will be presently explained, the motor 50 is continuously energized, but shaft 55 remains at its zero position until clutch device 51 is energized, whereupon shaft 55 commences to rotate. Thus, the amount of resistance introduced between the terminals 65 and 59 will depend entirely upon the duration of energization of the clutch device 51.

After a reading is taken, the arm 62 may be reset to zero to prepare the timing resistance unit 47 for a subsequent speed check. To permit such resetting, the shaft 55 is provided with a friction grip clutch 55' allowing the upper portion of the shaft to be at times rotated relative to the lower portion thereof. The arm 62 may be reset to zero manually, or alternatively, a suitable resetting mechanism may be provided. Such a resetting mechanism may comprise a reset plunger 56' slidably mounted in a supporting sleeve 57' secured to disc 56 substantially in radial alignment with shaft 55, the inner end of the plunger being engageable with the periphery of a spiral cam 58' secured on the upper portion of shaft 55. A coiled spring 59' surrounds plunger 56' and bears between sleeve 57' and a collar element 60' on the plunger, biasing the plunger outwardly. When the plunger is pushed inwardly it engages cam 58' and rotates said cam in a clockwise direction as viewed in FIGURE 8, until the radial edge 61' of the cam comes into engagement with the plunger. This resets the arm 62 to its zero position.

The motor 50 is continuously energized from a suitable source of current provided therefor on the supervisory vehicle.

The compensating resistance unit 48 comprises a conventional speedometer 67 whose indicating shaft is coupled to a rotary insulating supporting disc 68 on the periphery of which is mounted a resistance winding 69. The speedometer-actuated shaft 70 is grounded through the supporting bracket 71 associated with the assembly and is electrically connected to one end of the resistance winding 69 by a radial conductor 72, as shown in FIGURE 7. The peripheral resistance winding 69 is normally engaged by a contact arm 73 comprising one end of a lever 74 which is pivoted at 75 to the rear of the assembly but which is insulated therefrom. The assembly is mounted on the vehicle dashboard 76 so as to project rearwardly therefrom, as shown in FIGURES 6 and 7. The end of the lever 74 opposite the arm 73 is coupled to the pivoted armature 78 of a relay 79, as by a lever arm 80 pivoted at 81 to the dashboard 76, as shown in FIGURE 7. Suitable biasing means, not shown, is provided to urge the armature 78 upwardly, as viewed in FIGURE 2, so that the connecting lever 80 is biased in a counterclockwise direction, as viewed in FIGURE 2, which in turn biases the lever 74 clockwise, holding the contact arm 73 against the resistance element 69 with sufficient force to normally prevent rotation of the disc member 68 by the speedometer 67. As shown in FIGURE 7, the opposite ends of lever 80 are provided with longitudinal pin-connection slots, providing sliding and pivotal connections of the members 74 and 78 thereto.

It will be understood that the speedometer 67 which is of a conventional construction employs a magnetic drive whose force can be easily opposed by imposing sufficient restraint on the shaft element 70.

When the relay 79 is energized, the armature 78 rotates in a counterclockwise direction, as viewed in FIGURE 2, to engage its lower contact 82, which causes the insulated link 80 to rotate clockwise, causing arm 74 to rotate counterclockwise and to release its engagement with the resistance winding 69. Upon subsequent deenergization of the relay 79, the arm 73 is again moved into clamping engagement with the resistance winding 69, holding the disc member 68 in a rotated position corresponding to the speed of the supervisory vehicle, as would have been registered by the speedometer 67, and establishing a resistance value between ground and the contact arm 73 which is in accordance with said speed of the supervisory vehicle. As will be presently explained, this resistance value is added to the resistance value established by the timing resistance unit 47 to provide a correction in accordance with the speed of the supervisory vehicle 11. As will be readily understood, the member 68 will automatically reset to a position corresponding to the speed of the supervisory vehicle whenever relay 79 is energized.

The indicating unit 5 comprises an ohmmeter circuit which includes a meter 83 which is connected in the output circuit of a transistor 84, the input circuit of the transistor 84 comprising a current-dividing network which includes a branch containing the resistance elements of the variable resistance assemblies 47 and 48 connected in series. Thus, the emitter 85 of the transistor is connected to ground and the collector 86 is connected through a variable resistance 87 to one contact 88 of a push button switch 89. The meter 83 is connected between the contact 88 and the base 90 of the transistor so as to provide an indication corresponding to the output current of the transistor. The remaining contact 91 of switch 89 is connected to the positive terminal of a battery 92, and the negative terminal of the battery is connected through a fixed resistor 93 and a variable resistor 94 to ground. The switch contact 88 is connected by a wire 95 to the terminal 59 of resistance unit 47, and terminal 65 of said resistance unit is connected by a wire 96 to contact arm 73. Thus, a branch circuit to ground is defined from switch terminal 88 through wire 95, resistance winding 61, wire 96, contact arm 73 and resistance element 69. When switch 89 is closed, a first circuit is established connecting the meter 83 to the battery 92 as follows: The positive terminal of battery 92, contact 91, the pole of switch 89, contact 88, the meter 83, base 90, emitter 85, variable resistance 94, fixed resistance 93, and the negative terminal of battery 92. The closure of switch 89 also establishes a branch circuit including the meter 83, as follows: The positive terminal of battery 92, the switch contact 91, the pole of switch 89, the contact 88, wire 95, resistance element 61, wire 96, contact arm 73, resistance element 69, the ground connection of said resistance element, the variable resistance 94, the fixed resistance 93, and the negative terminal of battery 92. The current from the battery 92 will thereby divide, as between the branch containing the resistance elements 61 and 69 and the branch containing the meter 83, in accordance with the combined values of the resistance elements 61 and 69, so that the indication provided by the meter 83 will thus be in accordance with the resultant series value of resistance elements 61 and 69. The variable resistance 94 is employed to establish the zero position of the meter 83 and the variable resistance 87 is employed as a calibrating adjustment device. The meter 83 is calibrated in speed units.

As will be readily understood, the circuit employed in the unit 5 is essentially an ohmmeter circuit which is arranged to register values in accordance with the total series resistance of resistance elements 61 and 69, expressed in speed units, such as in miles per hour. When the total value of resistance of the elements 61 and 69 is small, for example, where the duration of energization of the clutch device 51 is relatively short and the speed of the supervisory vehicle is relatively low, a relatively small current will flow in the circuit containing the meter 83, and a low indication will be provided on the meter, although the calibration of the meter is such that this is a relatively high speed indication. On the other hand, when the total resistance of the resistance elements 61 and 69 is high, for example, where the duration of energization of the clutch device 51 is relatively long and the speed of the supervisory vehicle is relatively high, a much larger amount of current flows in the circuit branch including the meter 83, so that the swing of the meter needle is relatively large. However, the scale of the meter is calibrated so that this provides an indication of low vehicle speed.

It will be readily seen that the scale of the meter 83 may be suitably calibrated, in accordance with the magnitude of the resistance elements 61 and 69 and in accordance with the particular shape of the contact flange 64. Flange 64 is preferably of spiral shape giving a linear increment of resistance with angular rotation of shaft 55, but obviously any suitable shape may be employed for the flange 64 in accordance with the desired type of spacing of the units on the scale of meter 83.

As shown in FIGURE 2, one terminal of the winding of relay 79 is connected to ground and the other terminal of said winding is connected to the lower contact 82 of the relay. Said lower contact is connected by a wire 96' and a wire 97 to one contact 98 of a push button switch 99. The other contact 100 of switch 99 is connected to a wire 101, which connects the armature 78 to the contact 35 of the switch unit 3.

As shown, contact 36 of switch unit 3 is connected by a wire 102 to the lower contact 29 of the relay 25 associated with the rear vehicle-responsive unit 2. The armature 28 of relay 25 is connected by a wire 104 to a wire 105 which connects contacts 40 and 46 of the reversing switch unit 3. The remaining contact 43, associated with the pole 31, is connected by a wire 106 to the lower contact 18 of the relay 16 associated with the front vehicle-responsive unit 1. The armature 17 of relay 16 is connected by a wire 107 to the contact 45 of switch unit 3 and by a wire 108 to contact 42 thereof. The upper contact 19 of relay 16 is connected by a wire 109 to the contact 38 of switch unit 3. The contact 37 of switch unit 3 is connected by a wire 110 to the lower contact 111 of a relay 112, and is connected through the winding of relay 112 to ground, as shown. The armature 113 of relay 112 is connected to the wire 97 and is also connected by a wire 114 to the switch contact 41.

As shown, a battery 115 is provided to energize the relays 79 and 112, the negative terminal of the battery being connected to ground and the positive terminal of the battery being connected by a wire 116 to the contact 39 of the reversing switch unit 3.

The upper contact 30 of relay 25 is connected by a wire 117 to the reversing switch contact 44.

Assuming the supervisory vehicle 11 to be traveling along the roadway 12 in the manner shown in FIGURE 1, and assuming that the operator of the supervisory vehicle wishes to check the speed of an oncoming vehicle 13, the operator closes the switch 99. This energizes the relay 79 by a circuit comprising the positive terminal of battery 115, the wire 116, switch contact 39, pole 33, switch contact 40, wire 104, armature 28, bottom contact 29 of relay 25, wire 102, contact 36, pole 31, contact 35, wire 101, contact 100, the pole of switch 99, contact 98, wire 97, wire 96', the winding of relay 79, and ground. The relay 79 is held energized by a holding circuit connected across the switch 99 comprising the wire 96, contact 82, armature 78, and wire 101. The relay 79 remains energized until the circuit is broken by the raising of armature 28 from contact 29, which occurs when the vehicle 13 passes the rear vehicle-responsive unit 2, as will be presently described.

With relay 79 energized, the contact arm 73 disengages from the peripheral resistance 69, allowing the disc 68 to rotate to a position in accordance with the speed indication of speedometer 67. As previously described, when relay 79 becomes deenergized, contact arm 73 clampingly engages the resistor 69 to hold disc 68 in this rotated position.

When the oncoming vehicle 13 passes the front vehicle-responsive unit 1, the amplifier 15 is triggered and relay 16 becomes energized, moving armature 17 away from lower contact 18 and into engagement with its upper contact 19. This energizes the relay 112 by a circuit comprising the positive terminal of battery 115, the wire 116, the contact 39, the pole 33, the contact 40, the wire 104, the armature 28, the contact 29 of relay 25, the wire 102, the contact 36, the pole 31, the contact 35, the wire 101, armature 78, contact 82, wire 96', wire 97, wire 114, contact 41, pole 34, contact 42, wire 108, wire 107, armature 17, the upper contact 19 of relay 16, wire 109, contact 38, pole 32, contact 37, wire 110, the winding of relay 112, and ground. This moves armature 113 into engagement with contact 111 and energizes the clutch device 51 by a circuit comprising the same circuit that energizes the winding of relay 112, since the clutch device is connected in parallel with said winding. A holding circuit is established for relay 112 which is essentially the same as the holding circuit for the relay 79, said holding circuit comprising the winding of relay 112, the contact 111, the armature 113, the wire 97, the wire 96', the contact 82, the armature 78, the wire 101, the pole 31, the wire 102, the bottom contact 29 of relay 25, the armature 28 of said relay, the wire 104, the pole 33, the wire 116, the battery 115 and ground. Thus, relay 112 and the clutch device 51, connected in parallel threwith, remain energized until the relay 25 of the rear vehicle-responsive unit 2 is energized.

Since the clutch device 51 becomes energized, the arm 62 rotates, causing the resistance value between the terminals 65 and 59 to increase, in the manner above described.

When the vehicle 13 passes the rear vehicle-responsive unit 2, the amplifier 24 associated with the photo cell 23 in the rear unit 2 is triggered, energizing the relay 25 and raising armature 28 away from contact 29. This breaks the holding circuit of the relays 79 and 112, leaving the timer-actuated resistance unit 47 set at a value corresponding to the time required for the vehicle 13 to pass between the units 1 and 2, and leaving the resistance unit 48 set at a value corresponding to the speed of the supervisory vehicle.

The operator then closes the push button switch 89, which connects the resistance units 47 and 48 in series in the ohmmeter circuit above described, namely, connects the resistance elements 69 and 61 in series in the circuit between the contact 88 and ground and simultaneously connects the meter 83 in the remaining branch circuit, as above described, also connecting the battery 92 into the ohmmeter circuit so as to provide a flow of current in the branch circuit containing the meter 83 whose value is in accordance with the division of current, as described above and which provides a reading on the meter 83 giving the true speed of the passing vehicle 13.

As previously explained, the resistance unit 48 provides an increment of resistance in accordance with the speed of the supervisory vehicle which is added to the resistance provided by the resistance unit 47 to give the necessary compensation for the speed of the supervisory vehicle 11.

After the reading has been made by the closure of the switch 89, the arm 62 may be manually reset to its zero position, as previously explained, or a suitable resetting mechanism may be provided to automatically reset the arm 62 to its zero position responsive to the release of the push button switch 89.

The apparatus may be employed to measure the speed of a vehicle passing the supervisory vehicle from the rear when the supervisory vehicle is parked or stationary. To set the apparatus for this function, the reversing switch unit 3 is operated to move the poles 31 to 34 so that the poles connect the respective pairs of contacts 43, 35; 44, 37; 45, 39, and 46, 41. This reverses the relationship of the vehicle-responsive units 1 and 2, whereby the rear unit 2 responds to initiate the energization of the clutch device 51 and the front unit 1 responds to open the holding circuit for the relays 112 and 79 when the passing vehicle has left the vicinity of the front vehicle-responsive unit 1. In this instance, the ohmmeter circuit 5 merely provides a reading in accordance with the value established in the resistance unit 47, since the supervisory vehicle is stationary and no compensation is required. Thus, the arm 73 engages the resistance element 69 at its zero position and adds no resistance into the circuit containing resistance element 61. Therefore, the meter 83 provides a reading in accordance with the speed of the passing vehicle.

As above mentioned, the ohmmeter circuit 5 operates on the principle of a division of current in the two branches, one of them containing the variable resistance 87, the collector 86, and the emitter 85, representing the input circuit of the transistor 84, and the other branch comprising the series-connected resistance elements 61 and 69, both of these branches being connected to ground. This division of current causes corresponding output current flow in the output circuit of the transistor which contains the meter 83, namely, the circuit connected from the base 90 of the transistor to the collector 86 thereof. As previously explained, the division of current changes in accordance with the changes in value of the series-connected resistance components 47 and 48.

As shown in FIGURE 3, the insulated disc member 56 associated with the variable resistance unit 47 may be suitably calibrated to show the value of resistance included between the contact flange 64 and the conductive bracket member 57 in the various angular positions of the arm 62. As will be readily understood, this is also a measure of the time period of rotation of said arm, since the driving motor 50 is a constant speed synchronous clock motor. Since there is a direct relationship between the time period of rotation of said arm 62 and the value of the resistance between the terminals 65 and 59, disc member 56 may be calibrated in the manner illustrated in FIGURE 3, for example in ohms. By the use of a suitable conversion factor, dependent on the speed of the motor 50, the indicated resistance value on the disc 56 may be converted into the time value for the passing vehicle 13 to pass between the respective detection units 1 and 2.

As will be readily apparent, this computed time value is inversely proportional to the speed of the passing vehicle 13 when the supervisory vehicle 11 is stationary.

While a specific embodiment of an improved vehicle speed measuring apparatus has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a vehicle speed measuring apparatus, a pair of spaced vehicle-responsive detection members, a timing motor, a variable impedance, means to operatively connect said timing motor to said variable impedance responsive to the movement of a vehicle past the first detection member in a direction toward the second detection member, means to disconnect said timing motor from said variable impedance responsive to the continued movement of the vehicle past the second detection member, whereby a change in impedance is produced in said variable impedance corresponding to the time required for the vehicle to travel through the distance between the detection members, and means to measure said change in impedance.

2. In a vehicle speed measuring apparatus, a pair of spaced light-sensitive detection members mounted on a roadway adjacent the path of movement of a vehicle on the roadway, a timing motor, a variable resistor, means to operatively connect said timing motor to said variable resistor responsive to the reduction of ambient light reaching the first detection member produced by the movement of a vehicle past the first detection member in a direction toward the second detection member, means to disconnect the timing motor from said variable resistor responsive to the reduction of ambient light reaching the second detection member produced by the continued movement of the vehicle past the second detection member, whereby a change in resistance is produced in said variable resistance corresponding to the time required for the vehicle to travel through the distance between the detection members, and means to measure said change in resistance.

3. In a supervisory vehicle, a pair of vehicle-responsive detection members mounted in longitudinally spaced relation in positions exposed to passing vehicles, a timing motor, a variable impedance, means to operatively connect said timing motor to said variable impedance responsive to the movement of a vehicle past the forward detection member in a direction toward the rear detection member, means to disconnect said timing motor from said variable impedance responsive to the movement of the vehicle past the rear detection member, whereby a change in impedance is produced in said variable impedance corresponding to the time consumed in the relative movement of the vehicle through the distance between the detection members, a second variable impedance, means to vary said second impedance in accordance with the speed of the supervisory vehicle, and means to simultaneously measure the combined variation in impedance of said first and second variable impedances.

4. In a supervisory vehicle, a pair of vehicle-responsive detection members mounted in longitudinally spaced relation in positions exposed to passing vehicles, a timing motor, a variable impedance, means to operatively connect said timing motor to said variable impedance responsive to the movement of a vehicle past the forward detection member in a direction toward the rear detection member, means to disconnect said timing motor from said variable impedance responsive to the movement of the vehicle past the rear detection member, whereby a change in impedance is produced in said variable impedance corresponding to the time consumed in the relative movement of the vehicle through the distance between the detection members, a second variable impedance, means to vary said second impedance in accordance with the speed of the supervisory vehicle, means connecting the first and second impedances in series, and means to measure the total variation in impedance of the series-connected impedances.

5. In a supervisory vehicle, a pair of vehicle-responsive detection members mounted in longitudinally spaced relation in positions exposed to passing vehicles, a timing motor, a variable impedance, means to operatively connect said timing motor to said variable impedance responsive to the movement of a vehicle past the forward detection member in a direction toward the rear detection member, means to disconnect said timing motor from said variable impedance responsive to the movement of the vehicle past the rear detection member, whereby a change in impedance is produced in said variable impedance corresponding to the time consumed in the relative movement of the vehicle through the distance between the detection members, a second variable impedance, means to set said second impedance at a value corresponding to the speed of the supervisory vehicle, and means to simultaneously measure the combined variation in impedance of said first and second variable impedances.

6. In a supervisory vehicle, a first variable impedance, means to set the first variable impedance at a value corresponding to the time consumed by an oppositely moving vehicle in passing through the distance between two definite longitudinally spaced points on the supervisory vehicle, a second variable impedance, means to set the second impedance at a value corresponding to the speed of the supervisory vehicle, means to connect the first and second variable impedances in series, and means to measure the total impedance of the series-connected impedances.

7. In a supervisory vehicle, a first ambient light-sensitive detection member mounted on the forward portion of the vehicle and exposed laterally thereof, a second ambient light-sensitive member mounted on the rear portion of the vehicle and exposed to the same lateral side as the first detection member, a timing motor, a variable resistor, means controlled by said first light-sensitive member to operatively connect said timing motor to said variable resistor, means controlled by said second light-sensitive member to disconnect said timing motor from said variable resistor, whereby a change in resistance in said variable resistor is produced when a vehicle sequentially passes adjacent said first and second light-sensitive members, said change in resistance corresponding to the time consumed in such passage, and means to measure the change in resistance.

8. In a supervisory vehicle, a first ambient light-sensitive detection member mounted on the forward portion of the vehicle and exposed laterally thereof, a second ambient light-sensitive member mounted on the rear portion of the vehicle and exposed to the same lateral side as the first detection member, a timing motor, a variable resistor, means controlled by said first light-sensitive member to operatively connect said timing motor to said variable resistor, means controlled by said second light-sensitive member to disconnect said timing motor from said variable resistor, whereby a change in resistance in said variable resistor is produced when a vehicle sequentially passes adjacent said first and second light-sensitive members, said change in resistance corresponding to the time consumed in such passage, a speedometer, a second variable resistor, means operatively connecting said speedometer to said second variable resistor and setting said second variable resistor in accordance with the speed of the supervisory vehicle, means connecting said variable resistors in series, and means to measure the combined series resistance of said variable resistors.

9. In a supervisory vehicle, a first ambient light-sensitive detection member mounted on the forward portion of the vehicle and exposed laterally thereof, a second ambient light-sensitive member mounted on the rear portion of the vehicle and exposed to the same lateral side as the first detection member, a timing motor, a variable resistor, means controlled by said first light-sensitive member to operatively connect said timing motor to said variable resistor, means controlled by said second light-sensitive member to disconnect said timing motor from said variable resistor, whereby a change in resistance in said variable resistor is produced when a vehicle sequentially passes adjacent said first and second light-sensitive members, said change in resistance corresponding to the time consumed in such passage, a speedometer, a second variable resistor, means operatively connecting said speedometer to said second variable resistor and setting said second variable resistor in accordance with the speed of the supervisory vehicle, means connecting said variable resistors in series, a current responsive indicating device, a source of current, circuit means including a resistance connecting said source of current to said current-responsive indicating device, and means connecting the series-connected variable resistors across said resistance and current-responsive device in a manner to divide the current from said source between the series-connected variable resistors and the current-indicating device.

10. In a supervisory vehicle, a first ambient light-sensitive detection member mounted on the forward portion of the vehicle and exposed laterally thereof, a second ambient light-sensitive member mounted on the rear portion of the vehicle and exposed to the same lateral side as the first detection member, a timing motor, a variable resistor, means controlled by said first light-sensitive member to operatively connect said timing motor to said variable resistor, means controlled by said second light-sensitive member to disconnect said timing motor from said variable resistor, whereby a change in resistance in said variable resistor is produced when a vehicle sequentially passes adjacent said first and second light-sensitive members, said change in resistance corresponding to the time consumed in such passage, a speedometer, a second variable resistor, means operatively connecting said speedometer to said second variable resistor and setting said second variable resistor in accordance with the speed of the supervisory vehicle, means connecting said variable resistors in series, a circuit comprising a source of current and a first branch comprising a resistor and a current indicating device connected across said source of current, and means connecting the series-connected variable resistors across said first branch, whereby to divide the current from said source between said first branch and said series-connected variable resistors, and whereby an indication is provided by said current indicating device whose magnitude is in accordance with the combined resistance values of the variable resistors, said indication being substantially inversely in accordance with the actual speed of the passing vehicle.

References Cited in the file of this patent

UNITED STATES PATENTS

| | | |
|---|---|---|
| 1,995,606 | Edelman et al. | Mar. 26, 1935 |
| 2,656,002 | Keeton et al. | Oct. 20, 1953 |